US005261372A

United States Patent [19]

Traeger et al.

[11] Patent Number: 5,261,372

[45] Date of Patent: Nov. 16, 1993

[54] MANUAL ADJUSTMENT DEVICE FOR ADJUSTING A SETTING MEMBER

[75] Inventors: Friedrich Traeger; Jürgen Pfitzner, both of Berlin, Fed. Rep. of Germany

[73] Assignee: Licentia Patent-Verwaltungs-GmbH, Frankfurt am Main, Fed. Rep. of Germany

[21] Appl. No.: 943,556

[22] Filed: Sep. 11, 1992

[30] Foreign Application Priority Data

Sep. 11, 1991 [DE] Fed. Rep. of Germany ....... 4130125

[51] Int. Cl.[5] ........................ F02D 31/00; F16H 33/00

[52] U.S. Cl. ....................................... 123/357; 74/625

[58] Field of Search ................. 23/357, 358, 359, 365, 23/366, 367, 373, 372; 74/625

[56] References Cited

U.S. PATENT DOCUMENTS

| | | | |
|---|---|---|---|
| Re. 30,135 | 11/1979 | Fitzwater | 74/625 |
| 2,096,251 | 10/1937 | Knight | 74/625 |
| 2,324,211 | 7/1943 | Hodgson | 74/625 |
| 2,327,980 | 8/1943 | Bryant | 74/625 |
| 4,665,872 | 5/1987 | Eheim | 123/357 |
| 4,745,900 | 5/1988 | Thudt | 123/357 |
| 4,873,959 | 10/1989 | Law | 123/357 |
| 4,966,266 | 10/1990 | Yamada | 74/625 |
| 5,003,702 | 4/1991 | Han | 74/625 |

*Primary Examiner*—Carl S. Miller

*Attorney, Agent, or Firm*—Spencer, Frank & Schneider

[57] ABSTRACT

A manual adjustment device permits emergency operation of a vehicle if a stepping motor that normally adjusts the position of a setting member between two limit positions becomes inoperative due to an electrical malfunction. The rotor shaft (19) of the stepping motor (3) is provided with teeth (29). A pinion (31) can be brought into engagement with the teeth (29) against the force of a coil spring (35). The pinion (31) is disposed inside the stepping motor housing (17) and is mounted on an adjustment shaft (33) that extends through an opening in the housing (17). A manual adjustment element (51; 105) is disposed outside of the housing (17) and is connected to the adjustment shaft (33). The manual adjustment element (51; 105) can be manipulated to press the pinion (31) into engagement with the teeth (29) and to then rotate the rotor shaft (19).

17 Claims, 3 Drawing Sheets

MANUAL ADJUSTMENT DEVICE FOR ADJUSTING A SETTING MEMBER

CROSS REFERENCE TO RELATED APPLICATION

This application claims the priority of German Application No. P 41 30 125.0, filed Sep. 11, 1991, which is incorporated herein by reference.

BACKGROUND OF THE INVENTION

The present invention relates to a manual adjustment device for regulating the stroke length of a non-rotatable rod-shaped adjustment member that can be axially displaced between two limit positions by means of a switchable stepping motor and by way of a motion conversion mechanism. More particularly, the invention relates to a manual adjustment device for use in a vehicle if there is a malfunction in the electronic system of the vehicle.

In the construction of engines and vehicles, electronically controlled stepping motors are employed which regulate movement between two limit positions by means of a motion conversion mechanism. For example, German Patent 3,901,722 (corresponding to U.S. Pat. No. 5,080,063) discloses a mechanical speed regulator that is equipped with an electronically controlled adjustment device for fuel injection pumps in internal combustion engines, wherein a stepping motor is provided to correct the quantity of fuel in the range between full load and starting revolutions and a control device that processes engine and ambient parameters is provided for actuation of the stepping motor. If the electronic system malfunctions, it is no longer possible to make an adjustment if, for example, the limit position for the starting revolutions has been attained, so that the loaded motor vehicle can no longer be driven to the nearest service station.

SUMMARY OF THE INVENTION

It is an object of the present invention to provide a manual adjustment device for regulating the length of the stroke of an adjustment member that can be displaced between two limit positions so that, if the electronic system malfunctions, a predetermined position within the limit positions can be set manually. The maximum given stroke length must not be exceeded, by a single adjustment or by repeated adjustments, either.

This is accomplished by a manual adjustment device which is characterized in that the shaft of a stepping motor is provided with teeth that can be brought into engagement against the force of a coil spring with a pinion within the stepping motor housing, the pinion being mounted on an adjustment shaft, and in that the adjustment shaft is provided with a manual adjustment element that can be rotated from outside the stepping motor housing.

The advantage of this manual adjustment device is, in particular, that if the electronic system malfunctions, emergency operation of the device is possible by way of an electronically controlled stepping motor. Additionally, damage or destruction of the device by improper manual adjustments is reliably avoided. The intended adjustment stroke length can also not be exceeded.

DESCRIPTION OF THE PREFERRED EMBODIMENTS

Figure 1:
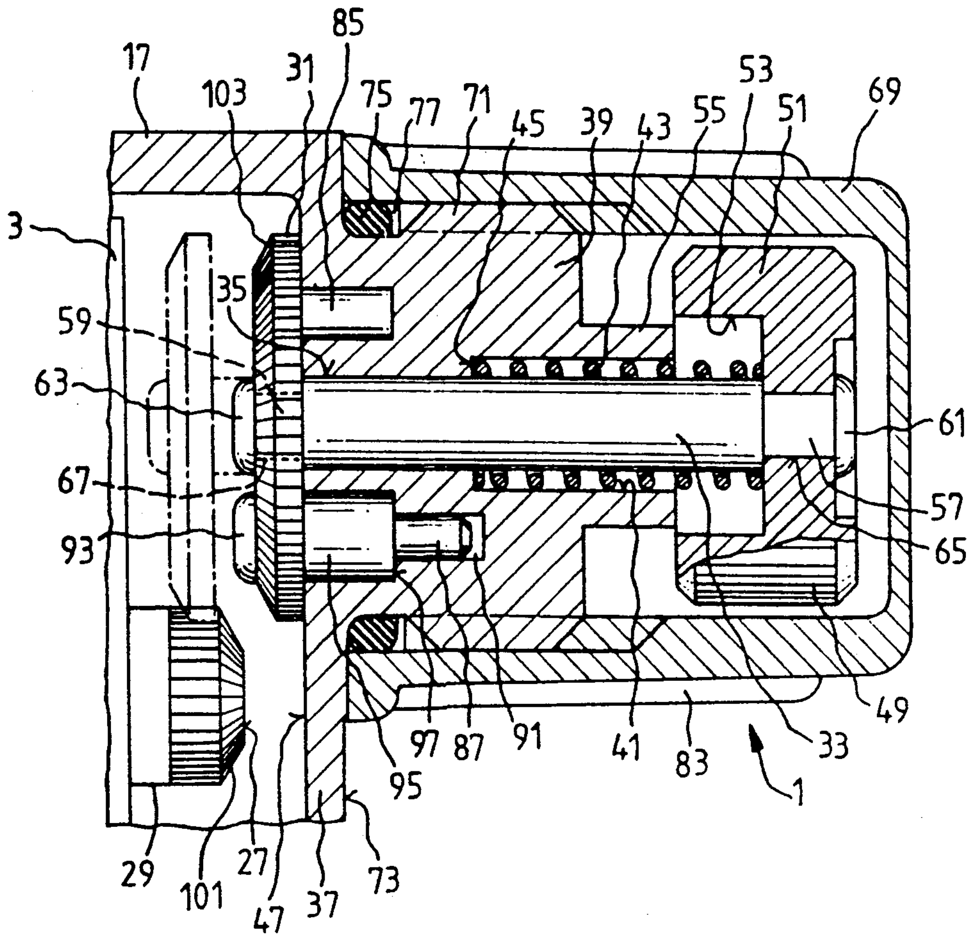
FIG. 1 is a sectional view showing a first embodiment of a manual adjustment device in accordance with the present invention.
Figure 2:
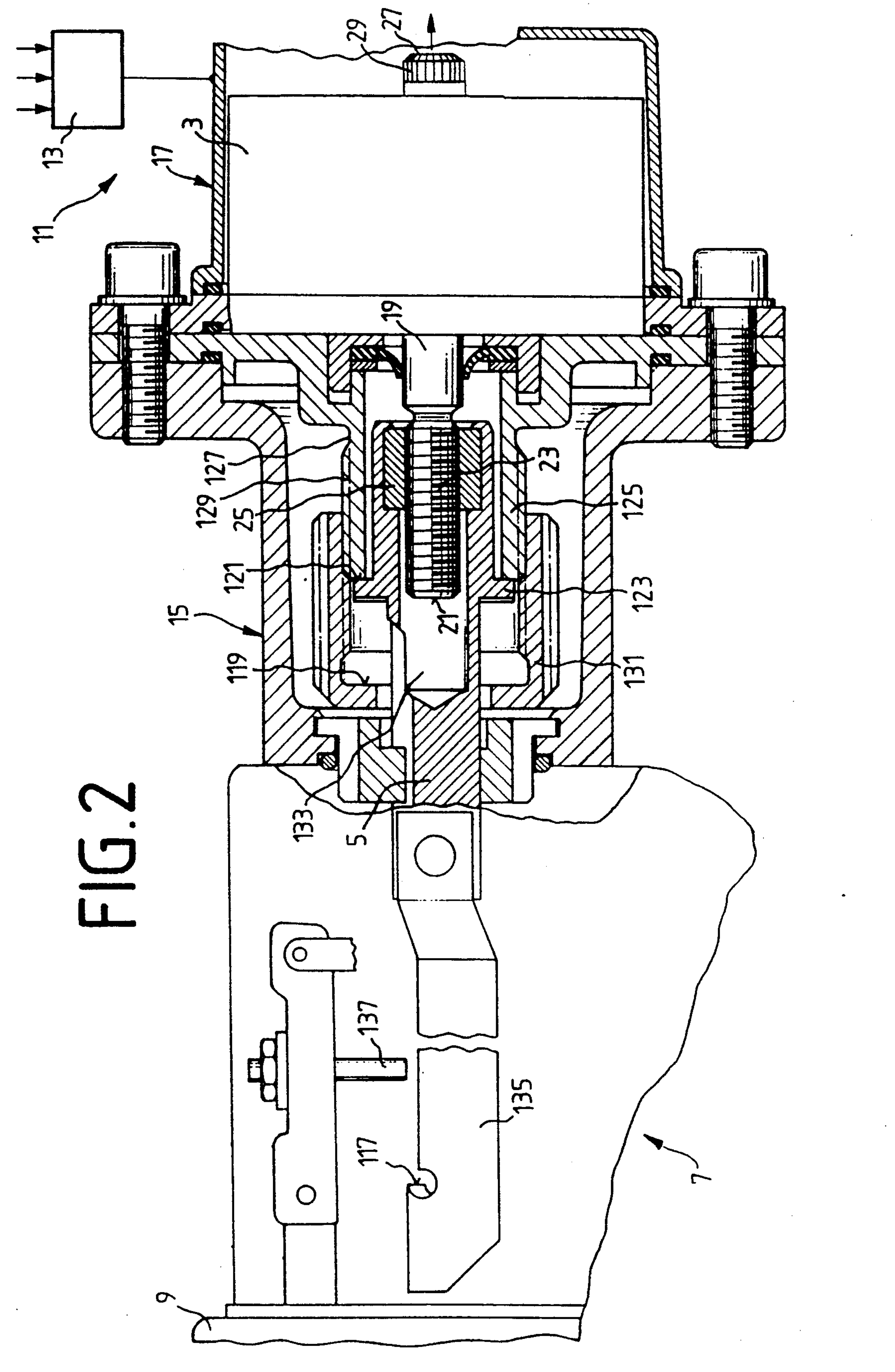
FIG. 2 is a sectional view of a regulator and stepping motor housing.

The manual adjustment device 1 according to FIG. 1 may be used with a mechanical speed regulator 7 for the fuel injection pump 9 of an internal combustion engine according to FIG. 2. The mechanical speed regulator 7 is equipped with an electrically controlled adjustment device 11 which includes a stepping motor 3. As will be discussed, the manual adjustment device 1 permits adjustment of the position of a non-rotatable, rod-shaped setting member 5 that is part of the mechanical speed regulator 7 and that is axially displaceable between two limit positions by means of the stepping motor 3 and a motion conversion mechanism.

In addition to the stepping motor 3, the electronically controlled adjustment device 11 includes an electronic control member 13. The stepping motor 3 is fastened to the end face of a regulator housing 15 and is actuated by the control member 13.

Control member 13 processes parameters such as induction system temperature, manifold pressure, number of revolutions, and so forth to produce a control value for the actuation of the stepping motor 3, which is disposed in a stepping motor housing 17. The rotor shaft 19 of stepping motor 3 is configured at one end 21 as a threaded spindle 23. If the spindle 23 is turned, the setting member 5 is axially displaced between two limit positions within the regulator housing 15 by way of a spindle nut 25 that is operatively connected with the spindle 23. The other end 27 of the rotor shaft 19 is provided with teeth 29. As shown in FIG. 1, the teeth 29 can be brought into engagement against the force of a coil spring 43 with a pinion 31 on an adjustment shaft 33 mounted in stepping motor housing 17. The end of adjustment shaft 33 that is provided with the pinion 31 is mounted in a bearing bore 35 in the side wall 37 of stepping motor housing 17 so as to be rotatable and displaceable. Side wall 37 is provided with a cylindrical protrusion 39 that is configured to be concentric with bearing bore 35. The protrusion 39 additionally accommodates a receiving bore 41 for the coil spring 43, which surrounds the adjustment shaft 33. One end of coil spring 43 engages a manual adjustment element, shown in FIG. 1 as a knob 51, and the other end of spring 43 engages the bottom 45 of receiving bore 41 so that, in the initial position of adjustment shaft 33, pinion 31 lies resiliently against the interior face 47 of side wall 37. The adjustment shaft 33 can be moved manually from outside stepping motor housing 17 using the knob 51.

The knob 51 is rotatable and is provided with knurling 49. Knob 51 is connected in a form-locking manner to the end of adjustment shaft 33 that extends from protrusion 39. When adjustment shaft 33 is displaced using knob 51 in order to bring pinion 31 into engagement with the teeth 29 of rotor shaft 19, a tubular portion 55 of protrusion 39 enters a cylindrical recess 53 in rotatable knob 51. The free ends of adjustment shaft 33 are provided with smaller diameter fastening pins 57 and 59 for rotatable knob 51 and for pinion 31, with the free ends of fastening pins 57 and 59 being spread into rivet heads 61 and 63, respectively.

The fastening pins 57 and 59 preferably have square cross sections and rotatable knob 51 and pinion 31 preferably have corresponding square openings 65 and 67.

In order to prevent arbitrary changes in the position of rotatable knob 51 and thus of adjustment shaft 33, a screw cap 69 that is closed at one end is used to shield rotatable knob 51. Screw cap 69 is screwed onto a thread 71 on the outer circumference of the cylindrical protrusion 39. Screw cap 69 contacts the exterior face 73 of stepping motor housing 17. In order to achieve a liquid tight seal, a sealing ring 75 is disposed in a cavity 77 between threads 71 on protrusion 39 and the exterior face 73 of stepping motor housing 17. Screw cap 69 may be loosened or tightened by way of knurling 83. Alternatively, a screw cap with a hexagonal periphery can be used so that it can be tightened or loosened with a wrench.

Figure 3:
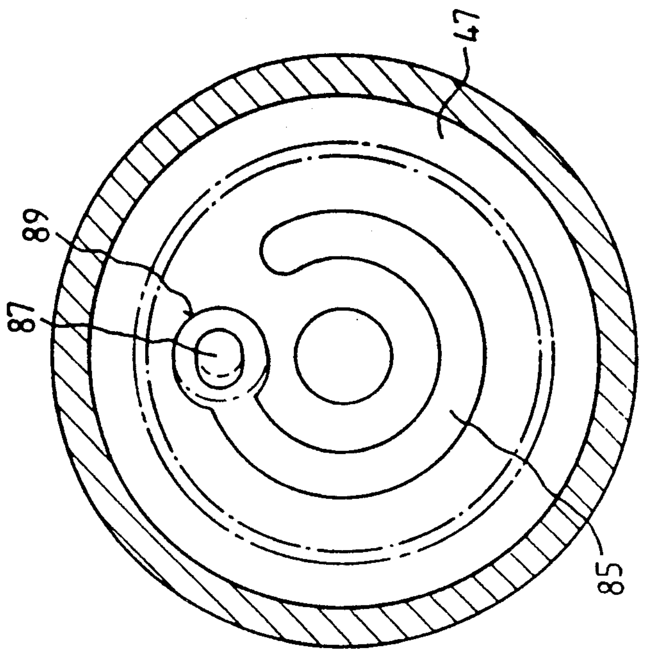
FIG. 3 is a top view of a guide groove in a protrusion shown in FIG. 1.

The electrically controlled adjustment device 11 is, of course, part of the electronic system of the vehicle. Therefore, in the case of a malfunction in the electronic system, the stepping motor 3 becomes inoperative and cannot move setting member 5 from whatever position it happened to have when the electronic system malfunctioned. The described manual adjustment device 1 permits emergency operation of the vehicle in that a given position within the existing limits can be set manually. The maximum predetermined extension, however, must not be exceeded, even if the adjustment process is repeated. For this purpose, adjustment shaft 33 is adjustable only within limits, for example about 300°. This is ensured in that the interior face 47 of stepping motor housing 17 is provided with a guide groove 85 (also see FIG. 3) that is arranged around about 300° concentrically with bearing bore 35 for a detent pin 87 carried by pinion 31. Detent pin 87 engages in a detent bore 91 disposed at one end of guide groove 85 when adjustment shaft 33 is in the starting position. This reliably prevents the adjustment shaft 33 from being accidentally rotated out of its starting position. Detent pin 87 is disposed at the free end of a riveted pin 93 attached to pinion 31, with a projection 95 in the form of a stop provided with a slide surface 97 being disposed between detent pin 87 and pinion 31. The diameter of this projection 95 is greater than the width of guide groove 85. Moreover, guide groove 85 is provided with a receiving bore 89 that is concentric with detent bore 91 to accommodate the projection 95 when adjustment shaft 33 is in the starting position. As soon as detent pin 87 has left detent bore 91 after displacement of adjustment shaft 33, rotary movement of adjustment shaft 33 and thus of pinion 31 is possible. During this rotary movement, the slide face 97 of projection 95 slides over the surface of interior face 47 in such a manner that pinion 31 is reliably held in engagement with teeth 29.

In order to facilitate the coupling of pinion 31 with the teeth 29 of rotor shaft 19, the mutually facing sides of teeth 29 and pinion 31 are provided with threading slopes 101 and 103.

Figure 4:
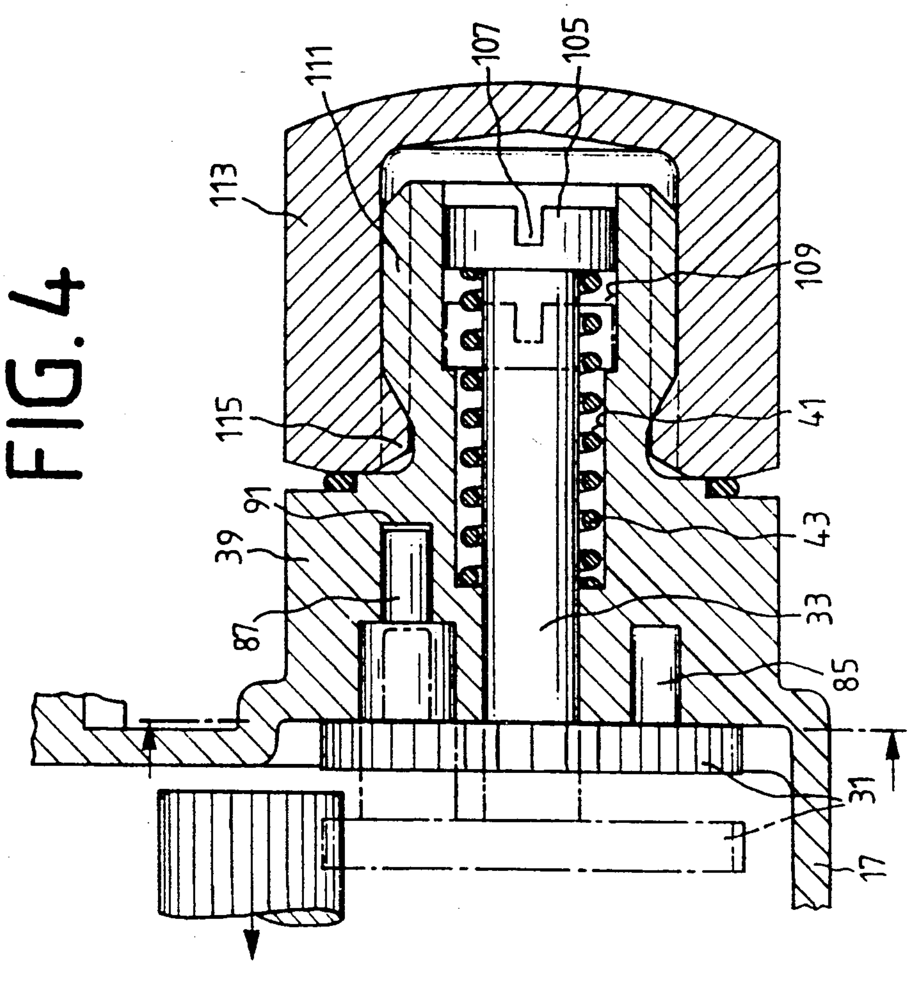
FIG. 4 is a sectional view showing a second embodiment of a manual adjustment device.

Within the scope of the invention, the manual adjustment device may also be configured as shown in FIG. 4. This manual adjustment device includes a screw head 105 that is equipped with a screw slot 107 for a screwdriver. The screw head 105 is mounted to be displaceable within a cylindrical guide recess 109 in a protrusion 39'. The guide recess 109 follows the receiving bore 41 for coil spring 43. Protrusion 39' is provided with threads 111 that are arranged concentrically with guide recess 109 for screwing on a unilaterally closed screw cap 113 equipped with an internal thread 115. The liquid-tight seal is here provided by an O-ring.

The manual adjustment devices shown in FIGS. 1 and 4 can used, as shown in FIG. 2, with a mechanical speed regulator 7 equipped with an electronically controlled adjustment device 11 for a fuel injection pump 9 in an internal combustion engine. A fuel quantity adjustment member 137 is connected to the fuel injection pump 9. The setting member 5 is normally driven by stepping motor 3 to adjust a stop 117 that cooperates with the member 137 as a function of the operating parameters of the internal combustion engine in order to correct the quantities of fuel supplied. Setting member 5 is movable between a first final stop 119 disposed shortly beyond the maximum full load control path and an oppositely acting second final stop 121 that lies shortly below the minimum full load control path. Both final stops 119 and 121 cooperate with a projection 123 on setting member 5 in order to limit the adjustment range. According to FIG. 2, final stop 121 is formed by a stop at a hollow cylindrical bearing member 125 which concentrically surrounds the rod-shaped adjustment member 5. The circumference 127 of member 125 has a thread 129 which permits adjustment of a control nut 131 that provides the other final stop 119. The end of rod-shaped setting member 5 that is disposed in regulator housing 15 has a blind bore 133 in which the spindle nut 25 for spindle shaft 23 is firmly held. The other end of setting member 5 extends out of the controller housing 15 and is connected with a control tab 135 that includes the stop 117. With the aid of the manual adjustment device it is possible, if the electronic system malfunctions, to displace stop 117 and thus the full load control path in such a manner that the motor vehicle can be reliably driven to the next service station despite the electrical malfunction.

The described mechanical manual adjustment device according to the invention may also be employed in devices for adjusting choke flaps in motor vehicles.

It will be understood that the above description of the present invention is susceptible to various modifications, changes, and adaptations, and the same are intended to be comprehended within the meaning and range of equivalents of the appended claims.

What we claim is:

1. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the rotor shaft has first and second ends, the teeth being disposed at the first end of the rotor shaft, wherein the second end of the rotor shaft has a threaded region, and wherein the means for moving the setting member comprises a spindle nut which engages the threaded region of the rotor shaft and which is operatively connected to the setting member.

2. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the motor housing has an inner surface, wherein the mounting means comprises a protrusion which extends outward from the motor housing, the protrusion having a receiving bore with a bottom end, wherein the opening in the motor housing is a bearing bore which extends from the bottom end of the receiving bore to the inner surface of the motor housing, and wherein the spring means comprises a coil spring which extends from the bottom end of the receiving bore to the manual adjustment element, the pinion being pressed against the inner surface of the motor housing by the coil spring when the manual adjustment element is in a predetermined starting position.

3. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the manual adjustment element is a knob provided with knurling, the knob having an opening to receive the outer end of the adjustment shaft, and wherein the opening in the knob and the outer end of the adjustment shaft are configured to lock the knob to the adjustment shaft with respect to rotation.

4. The manual adjustment device of claim 3, wherein the mounting means comprises a protrusion which extends outward from the motor housing, the adjustment shaft extending through the protrusion, wherein the knob has a cylindrical recess, and wherein the protrusion enters the recess when the pinion is pressed into engagement with the teeth.

5. The manual adjustment device of claim 4, wherein the adjustment shaft has fastening pins at its inner and outer ends, the fastening pin at the inner end of the adjustment shaft extending through an opening in the pinion and the fastening pin at the outer end of the adjustment shaft extending through the opening in the knob, and wherein the fastening pins have free ends that are spread to provide rivet heads.

6. The manual adjustment device of claim 5, wherein the fastening pins have polygonal cross sections and the openings in the pinion and knob have corresponding polygonal cross sections.

7. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth, the mounting means including a protrusion which extends outward from the motor housing and which has an outer periphery with a threaded region, the adjustment shaft extending through the protrusion;

a pinion mounted on the inner end of the adjustment shaft;

spring means for urging the adjustment shaft toward the outside of the motor housing;

a manual adjustment element connected to the outer end of the adjustment shaft so that the pinion can be brought into engagement with the teeth against the force of the spring means to permit the rotor shaft to be rotated from outside the motor housing; and a cap screwed onto the threaded region to cover the manual adjustment element.

8. The manual adjustment device of claim 7, wherein the threaded region of the protrusion is spaced apart from the motor housing by a gap, and further comprising a sealing ring in the gap, the sealing ring contacting the cap.

9. The manual adjustment device of claim 8, wherein the cap has a hexagonal periphery for engagement by a wrench.

10. The manual adjustment device of claim 8, wherein the cap is provided with knurling.

11. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the mounting means includes rotation-limiting means for preventing the adjustment shaft from being rotated through an angle that is greater than a predetermined angle.

12. The manual adjustment device of claim 11, wherein the inside of the motor housing has a curved groove which partially encircles the opening in the motor housing, the groove having two groove ends and having a detent bore at one of the groove ends, and wherein the rotation-limiting means comprises a detent pin and means for connecting the detent pin to the pinion, the detent pin extending into the detent bore when the manual adjustment element is in a predetermined starting position.

13. The manual adjustment device of claim 12, wherein the means for connecting the detent pin to the pinion comprises a stop projection riveted to the pinion, the stop projection having a slide face from which the detent pin extends, the slide face having a width that is greater than the width of the groove, and wherein the groove additionally has a receiving bore that is aligned with the detent bore, the stop projection extending into the receiving bore when the manual adjustment element is in the starting position.

14. The manual adjustment device of claim 13, wherein the rotor shaft has an end with a sloping region, the teeth carried by the rotor shaft extending into the sloping region, and wherein the pinion has a face with a sloping region, and teeth that extend into the sloping region.

15. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the motor housing has an inner surface, wherein the mounting means comprises a protrusion which extends outward from the housing, the protrusion having a cylindrical guide recess with a bottom end and a receiving bore extending from the bottom end of the guide recess, the receiving bore having a bottom end, wherein the opening in the motor housing is a bearing bore which extends from the bottom end of the receiving bore to the inner surface of the motor housing, wherein the manual adjustment element comprises a screw head having a screwdriver recess, the screw head being movably disposed in the guide recess, and wherein the spring means comprises a coil spring which extends from the bottom end of the receiving bore to the screw head, the pinion being pressed against the inner surface of the motor housing by the coil spring when the manual adjustment element is in a predetermined position.

16. The manual adjustment device of claim 15, wherein the protrusion has an outer periphery with a threaded region, and further comprising a cap screwed onto the threaded region to cover the screw head.

17. A manual adjustment device, for use with a motor housing, a motor which is disposed within the motor housing and which includes a rotor shaft, and a mechanism which includes a non-rotatable rod-shaped setting member that is axially movable between two limit positions and means for moving the setting member when the rotor shaft rotates, to adjust the position of the setting member if a malfunction occurs in an electrical system that normally drives the motor, said manual adjustment device comprising:

teeth carried by the rotor shaft;

an adjustment shaft having inner and outer ends;

mounting means for mounting the adjustment shaft on the motor housing so that the adjustment shaft movably extends through an opening in the motor housing, with the outer end of the adjustment shaft being disposed outside the motor housing and with the inner end of the adjustment shaft being disposed inside the motor housing and being positioned adjacent the teeth;

a pinion mounted on the inner end of the adjustment shaft;

spring means for urging the adjustment shaft toward the outside of the motor housing; and a manual adjustment element connected to the outer end of the adjustment shaft so that the pinion can be brought into engagement with the teeth against the force of the spring means to permit the rotor shaft to be rotated from outside the motor housing, wherein the mechanism is a mechanical speed regulator which additionally includes a control tab having a stop that cooperates with a fuel quantity adjustment member carried by a fuel injection pump, the control tab being connected to the setting member, a hollow cylindrical bearing member which concentrically surrounds the setting member, the bearing member having a threaded outer periphery and having an end which provides one of the limit positions, and a control nut having an opening through which the setting member extends, the control nut being screwed onto the threaded periphery of the bearing member and providing the other of the limit positions.

* * * * *